(12) United States Patent
Bisset et al.

(10) Patent No.: US 6,584,495 B1
(45) Date of Patent: Jun. 24, 2003

(54) UNSHARED SCRATCH SPACE

(75) Inventors: Jeffrey A. Bisset, Issaquah, WA (US);
Michael Jerger, Redmond, WA (US);
Michael Toutonghi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/016,880

(22) Filed: Jan. 30, 1998

(51) Int. Cl.$^7$ ............................................. G06F 15/16
(52) U.S. Cl. ....................... 709/217; 709/208; 709/228; 717/168
(58) Field of Search .................... 709/1, 100, 104, 709/208–209, 211–212, 216, 223, 227–229, 231, 203; 717/168

(56) References Cited

U.S. PATENT DOCUMENTS

| | | | |
|---|---|---|---|
| 5,375,207 A | | 12/1994 | Blakely et al. |
| 5,835,712 A | | 11/1998 | DuFresne |
| 5,890,189 A | * | 3/1999 | Nozue et al. ............... 711/100 |
| 5,892,904 A | | 4/1999 | Atkinson et al. |
| 5,911,044 A | * | 6/1999 | Lo et al. ..................... 709/203 |
| 5,919,247 A | | 7/1999 | Van Hoff et al. |
| 5,974,549 A | * | 10/1999 | Golan ......................... 713/200 |
| 6,026,474 A | * | 2/2000 | Carter et al. |
| 6,167,522 A | * | 12/2000 | Lee et al. .................... 713/201 |
| 6,225,993 B1 | * | 5/2001 | Lindblad et al. ............ 345/327 |
| 6,263,442 B1 | * | 7/2001 | Mueller et al. .............. 713/201 |
| 6,275,938 B1 | * | 8/2001 | Bond |

OTHER PUBLICATIONS

Kristol et al., "HTTP State Management Mechanism," pp. 1–19 (Feb. 1997).
"Microsoft Security Management Architecture White Paper," pp. 1–9 (May 1997).

\* cited by examiner

*Primary Examiner*—Zarni Maung
*Assistant Examiner*—G. L. Opie
(74) *Attorney, Agent, or Firm*—Klarquist Sparkman, LLP

(57) ABSTRACT

A computerized method provides unshared local storage space to a process distributed by a trusted source through the use of an identity associated with the process that specifies local capabilities for the identity on a computer. The method obtains the identity and allocates the local storage space based on the information on the local capabilities, securing the space with the identity so that only a process with the same identity can access the space. The method also enforces the local capabilities on the process by monitoring the use of the local storage space. The identity is uniquely defined by a digital certificate or similar security facility. The identity is associated with a data structure, such as a digital signature, that includes the size of the local storage space and, optionally, whether the process is subject to global storage limits set by the computer. A computerized system which executes the method is also disclosed.

17 Claims, 6 Drawing Sheets

UNSHARED SCRATCH SPACE

FIELD OF THE INVENTION

This invention relates generally to distributed processing, and more particularly to enabling a process distributed by a trusted source access to persistent local storage.

BACKGROUND OF THE INVENTION

Distributed processing in a client-server environment permits a process running on a local, or client, computer to access data and/or execute a process on a remote, or server, computer, and permits the remote process access to local data. One challenge in distributed processing is making the interaction between the local process and the remote process transparent so that a user working on the local computer is unaware of the location of the processes and the data. The challenge becomes particularly acute when the local and remote machines are on a wide-area network, such as the World Wide Web, because the slowness of the underlying communication medium introduces delays in exchanging data on a real-time basis. Therefore, time-critical portions of the remote process and some of the remote data are typically temporarily downloaded for execution on the local computer. This approach is common in small, executable applications, called applets, which are downloaded from a Web server.

While downloading executable content provides web page designers more options for producing better content, it exposes the client machine and any resources accessible through the client machine to the outside world. For this reason, applets are normally run with a number of restrictions that limit the resources they may access. The restrictions placed on downloaded executable content are collectively referred to as a "sandbox." For example, two relevant restrictions on Java applets are that they may only establish network connections to the web server from which they were loaded, and they may not access the local file system.

However, downloaded applets may require a large amount of persistent storage on the local computer to store data to be accessed by another instance of the applet or another process. For example, a word processor may need to store a document created by the user on the local computer, or a real-time news feed may need to maintain configuration information about the video and audio capabilities of the local computer. Installed libraries may also need storage space separate from that provided to the applet using the library function.

One form of persistent local storage for a Web applet is the "cookie" which is stored in a cookie file on the local hard drive. The use of cookies for persistent storage is limited because access to a cookie is keyed to the remote host and is restricted to only a single cookie per host. In addition, there is no flexibility in the type of storage provided so the storage space is not configurable to the needs of the program using it.

Regardless of its desirability, permitting downloaded applets access to a local storage system introduces a myriad of security issues. The sandbox approach mentioned above provides security but lacks the persistence characteristic needed in many cases. Only applets from a known and trusted source should be allowed access to persistent local storage. One approach that depends on the trusted source concept is provided by "push" technology.

When the client initiates the download process from the client side, the client is often said to be "pulling" the information from the server. In contrast, push technology enables a server to automatically send information, usually on a regular schedule, to a client computer that "subscribes" to a particular service offered by the server. The user essentially establishes the server as a trusted source when he/she subscribes. One common application for push technology is to deliver news headlines to a user every hour. Push technology can also be used to automatically deliver application code to the client computer when it becomes available. Castanet software from Marimba Inc., for example, permits a user to subscribe to a "channel" that automatically downloads certain types of applications or software updates. Unlike news headlines which are transient and suitable for storage in a temporary manner, code pushed down from the server requires persistent storage space on the client. Therefore, Castanet defines a directory on the hard drive of the client for each subscribed channel. However, the push technology approach relies on the user subscribing to a channel as establishing the server as a trusted source; no additional checking on the identity of the source is performed. Furthermore, no size limitation is placed on the amount of data downloaded for each subscribed channel.

Because existing file system interfaces have neither the ability to grant access to persistent local storage areas based on the identity of the source of the applet, nor to control the amount of data written to the file system when such access is granted, there is a need for a mechanism to provide persistent local storage that is controlled in size to certain, identified applets. Furthermore, such a mechanism should be flexible in the type of persistent local storage provided.

SUMMARY OF THE INVENTION

Unshared local storage paces is provided by a client computer to a process executing on behalf of an identity. An identity for the process is determined and the client computer allocates the local storage space based on information specifying local capabilities for the identity. The space is secured with the identity so that only processes executing on behalf of a common identity can access the local storage space for the identity. The local capabilities are enforced by monitoring the use of the local storage space by all processes executing on behalf of the identity. The identity is uniquely defined by a digital certificate or similar security facility. The identity is associated with a data structure, such as a digital signature, that includes the size of the local storage space and, optionally, whether the process is subject to global storage limits set by the computer. The type of local storage controlled by the identity can be on any persistent media such as a hard disk, removable media, or non-volatile memory, without limitation.

Thus, the identity and its associated data structures permit an application acquired from a trusted source access to local storage which is secured, limited and flexible. Keying the local storage to the identity is superior to the standard applet sandboxing approach in that it provides persistent storage without sacrificing security. Furthermore, unlike push technology, the decision to trust a source can be made prior to the time the application is acquired from the source.

The present invention describes systems, clients, servers methods, and computer-readable media of varying scope In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a Java implementation of the invention for use with the World Wide Web is described. Finally, in the fifth section, a conclusion of the detailed description is provided.

Hadware and Operating Environment

Figure 1:
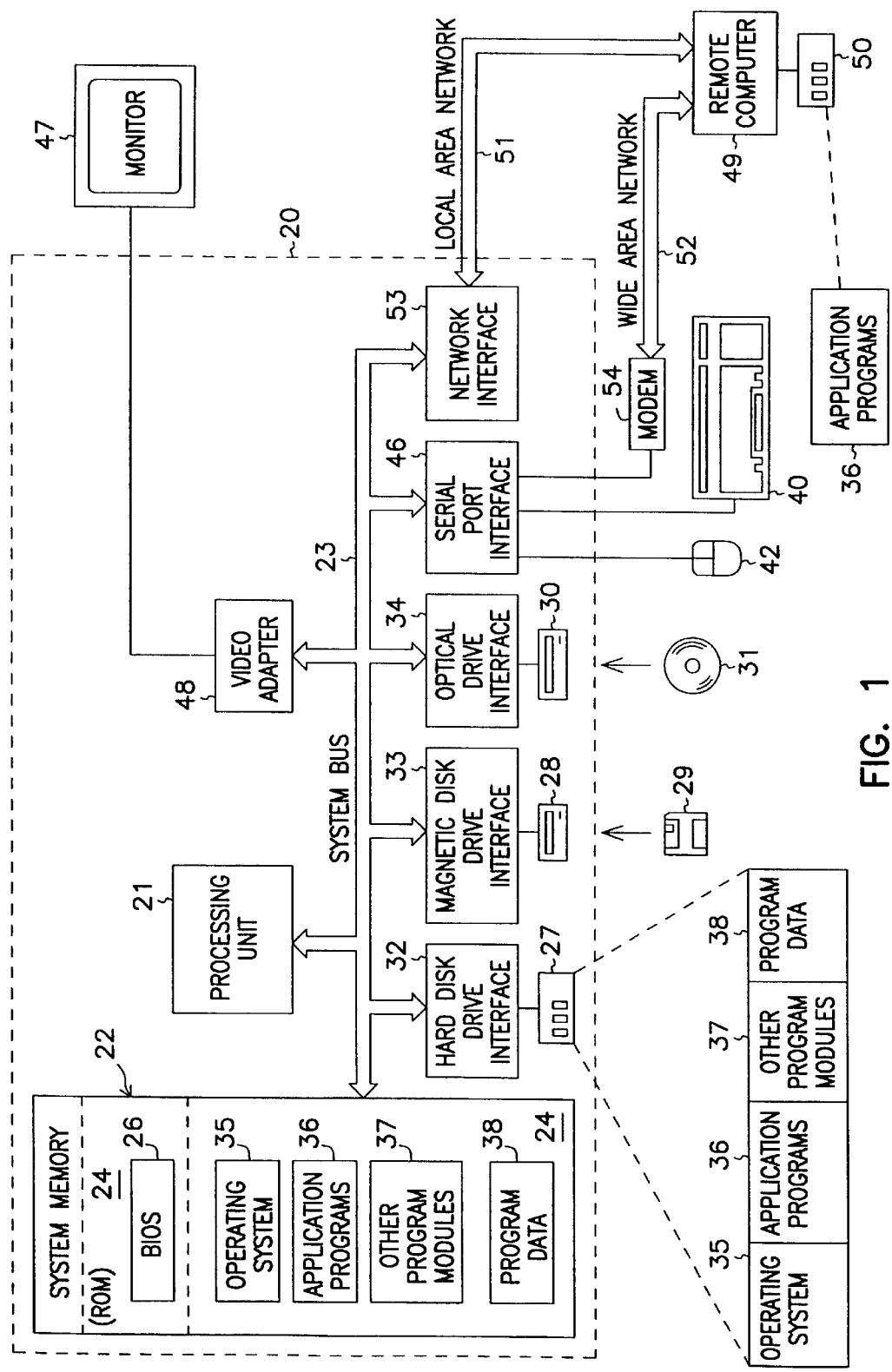
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 rather includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer, the invention is not so limited. Such a computer typically includes one or more processing units as its processor, and a computer-readable medium such as a memory The computer may also include a communications device such as a network adapter or a modem, so that it is able to communicatively couple with other computers.

System Level Overview

After a brief discussion of common data security terms and procedures, a system level overview of the operation of an exemplary embodiment of the invention is described by reference to FIGS. 2A, 2B, and 2C.

A "principal" is a uniquely identified entity that can represent an organization, a user, a process, a library, a code thread, or the like. A digital "certificate" is associated with each principal and it is the certificate that uniquely identifies the principal. The principal acquires the certificate from a trusted certificate authority (CA), such as VeriSign, Inc., and attaches the certificate to its data Certificates from a CA are guaranteed to uniquely identify a principal in all systems. A user or a system administrator uses the certificates to classify certain principals as F trustworthy so that any data associated with those principals is always accepted. A principal can acquire different certificates from different CAs, or more than one certificate from a single CA, but all the certificates serve the same function: to uniquely identify the principal.

The principal also attaches a digital signature to its data. The digital signature is an encoded data string which validates the integrity of the associated data because the data cannot be modified after it is digitally "signed" without corrupting the signature. A digital signature is created with an encryption algorithm, such as those available from RSA Data Security, Inc., and is decrypted with a particular key If the key decrypts the digital signature properly, the integrity of the data is confirmed. In a simple form, the certificate attached to the data contains the particular key necessary to decode the digital signature also attached to the data.

An example of the security operation is described with reference to FIG. 1. A software company, the principal, maintains a number of programs, libraries and data on the remote computer 49 and makes this information available for downloading by users on the wide area network 52. The software company is uniquely identified on the wide area network 52 by its certificate. A user on computer 20 has determined that the software company is trustworthy and sets up a network browser program, such as Microsoft Internet Explorer, to automatically accept data having the principal's certificate(s). The browser downloads a program from the remote computer 49 when requested to do so by the user, verifies the attached certificate is genuine, and validates that the program is uncorrupted using the attached digital signature. When the user runs the downloaded program within the runtime environment of the computer 20, the downloaded program is referred to as executing on behalf of its principal.

As well-known in the art, a digital signature can do more than just verify the validity of data if additional information is encrypted as part of the signature. The digital signature used in the present invention contains information that determines local capabilities for the principal when a program is executing on its behalf on a local computer. The local capabilities can designate a maximum amount of local storage that all programs executing on behalf of the principal are permitted to use on the computer. Optionally, the digital signature of the present invention also can specify whether the principal is subject to a global storage limit set by the runtime environment of the local computer. Although in this example the user downloads the desired program from a remote server on a wide area network, the user could also acquire the program through any other available means of program distribution, such as CD-ROM or the like, without changing the operation of the certificate and the digital signature.

Figure 2A:
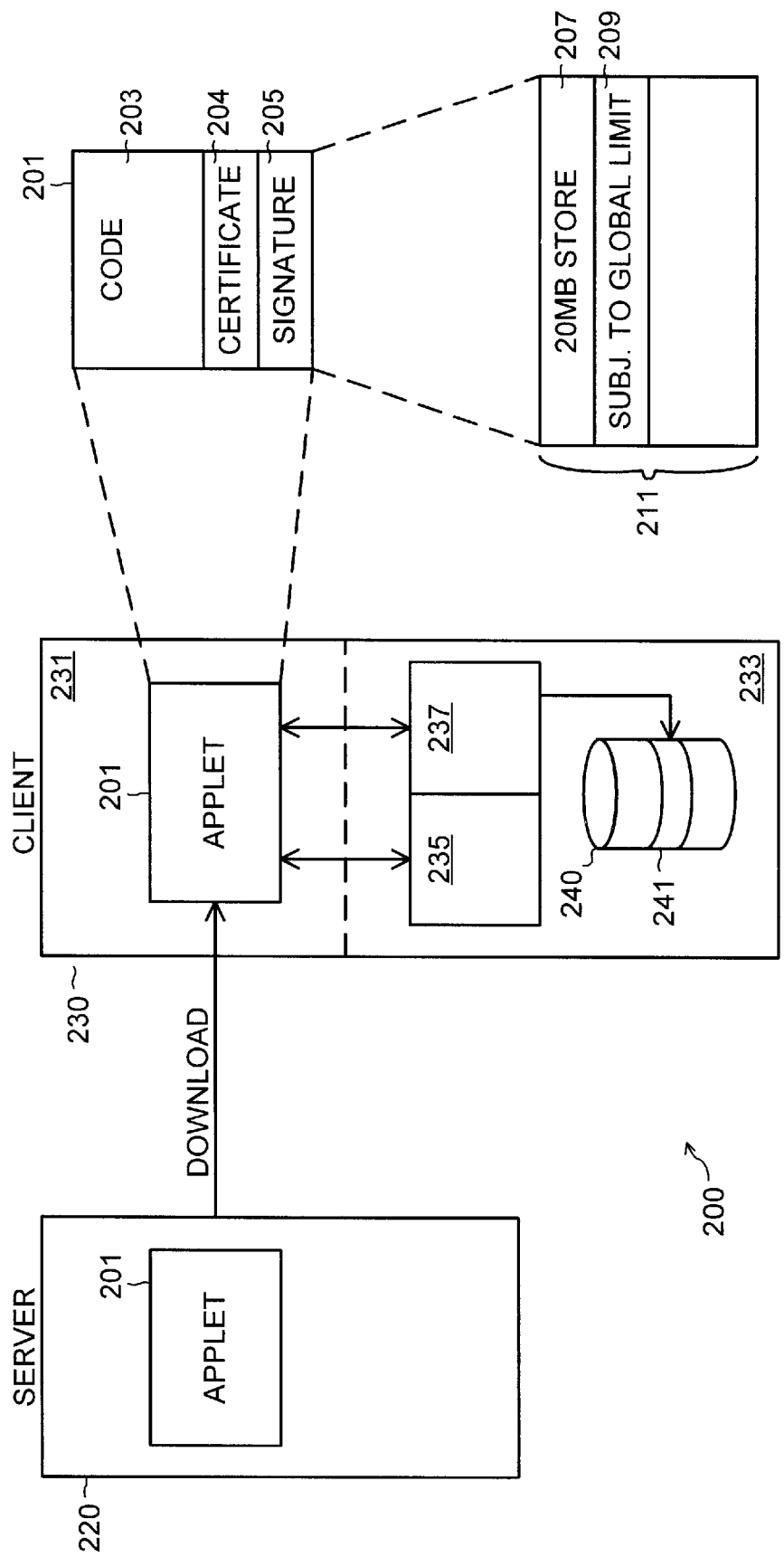
FIGS. 2A, 2B, and 2C are diagrams illustrating system level overviews of an exemplary embodiment of the invention; and, FIGS. 3A, 3B, and 3C are flowcharts of methods to be performed by a local computer according to an exemplary embodiment of the invention.

The distributed processing environment 200 shown in FIG. 2A comprises a server computer 220 and a local, or client, computer 230. A distribution data structure for an applet 201 is stored on the server computer 220 and contains executable applet code 203, and a digital certificate 204 and a digital signature 205 attached to the applet code 203 by the principal. The applet code 203, in this exemplary embodiment, is written in an object-oriented language such as Java. The applet 201 is downloaded from the server computer 220 to the client computer 230 and executes on behalf of its principal in a runtime environment 231. Applet 201 has direct access to a limited amount of temporary storage space within the runtime environment 231 (a "sandbox" which is not shown in FIG. 2A). For security reasons, the applet code 203 is not given direct access to persistent local storage space 240, illustrated as a hard disk, in the client computer 230. Instead the applet 201 indirectly accesses the local storage 240 through a global client storage manager API (application program interface) 235 and a storage monitor 237 both of which run in a native code environment 233 on the client computer 230.

As described above, the digital signature 205 contains the local capabilities for the principal when an instance of the applet code 203 executes on behalf of the principal on a client computer such as client 230. As shown in FIG. 2A, when decrypted, the exemplary digital signature 205 is a data structure 211 that includes a principal limit field 207 and a global limit field 209. The principal limit field 207 specifies the amount of local storage all processes executing on behalf of a common principal are permitted to use. The global limit field 209 indicates whether the amount of local storage allocated to the principal is subject to any global limit imposed by the client computer 230 as explained below. An authentication process, such as described above, executing on the client computer 230 decrypts the digital signature 205 of the applet 201 to determine that the principal for the applet 201 is permitted to store up to 20MB of local data. The decoded digital signature 205 also specifies that local storage area for the principal for the applet 201 is subject to global storage limits set by the client computer 230. In an alternate embodiment, the digital signature 205 does not contain the global limit field 209.

The applet code 203 executes in the runtime environment 231 on the client computer 230. When the applet code 203 needs to store data outside of its sandbox, it requests local storage space through the global API 235. The global API 235 assigns to the applet 201 an individual storage monitor 237 keyed to the certificate 204 for the principal of the applet 201. The storage monitor 237 allocates an amount of local space 241 in the persistent local storage area 240 to applet 201 and provides access to the local space 241 for the applet 201. Output from the applet 201 being written to the local space 241 is monitored by the storage monitor 237 to prevent the applet 201 from exceeding the principal limit 207 specified in its digital signature 205. Because the digital signature 205 also contains the global limit field 209, the storage monitor 236 also monitors the data being written by the applet 201 to prevent it from exceeding the global limit set by the client computer 230.

Figure 2B:
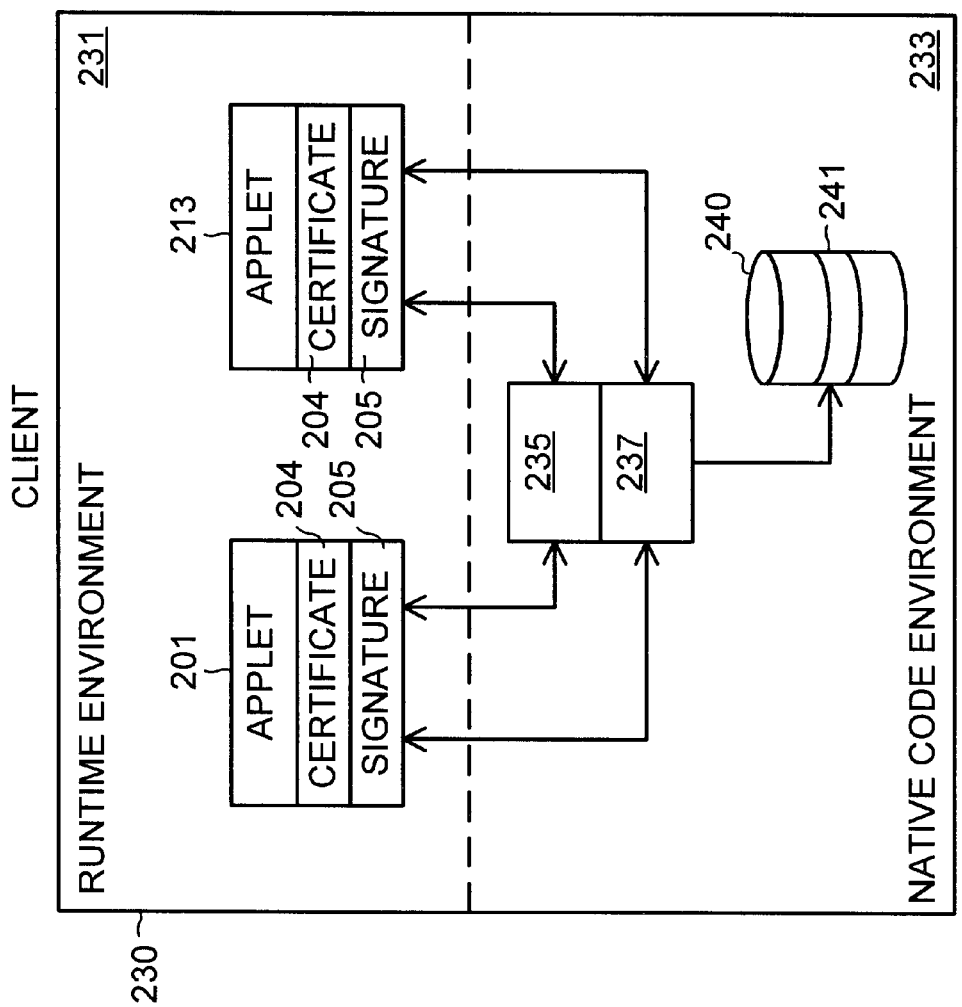

Referring now to FIG. 2B, the client 230 in FIG. 2A has downloaded a second applet 213 from the server 220. The second applet 213 has the same certificate 204 as the first applet 201. Because the assignment of a storage monitor is keyed to the certificate attached to a program or process, multiple processes that have a common certificate share the same local storage space. Thus as shown in FIG. 2B, the global API 235 assigns the same storage monitor 237 to the applet 201 and applet 213 so both have access to the local space 241. The advantage of sharing the local storage space becomes apparent when, for example, a principal provides a word processing applet and a clip art applet. Attaching the same certificate to both applets enables the word processing applet to access a clip art image created and stored in the local storage space by the clip art applet.

Figure 2C:
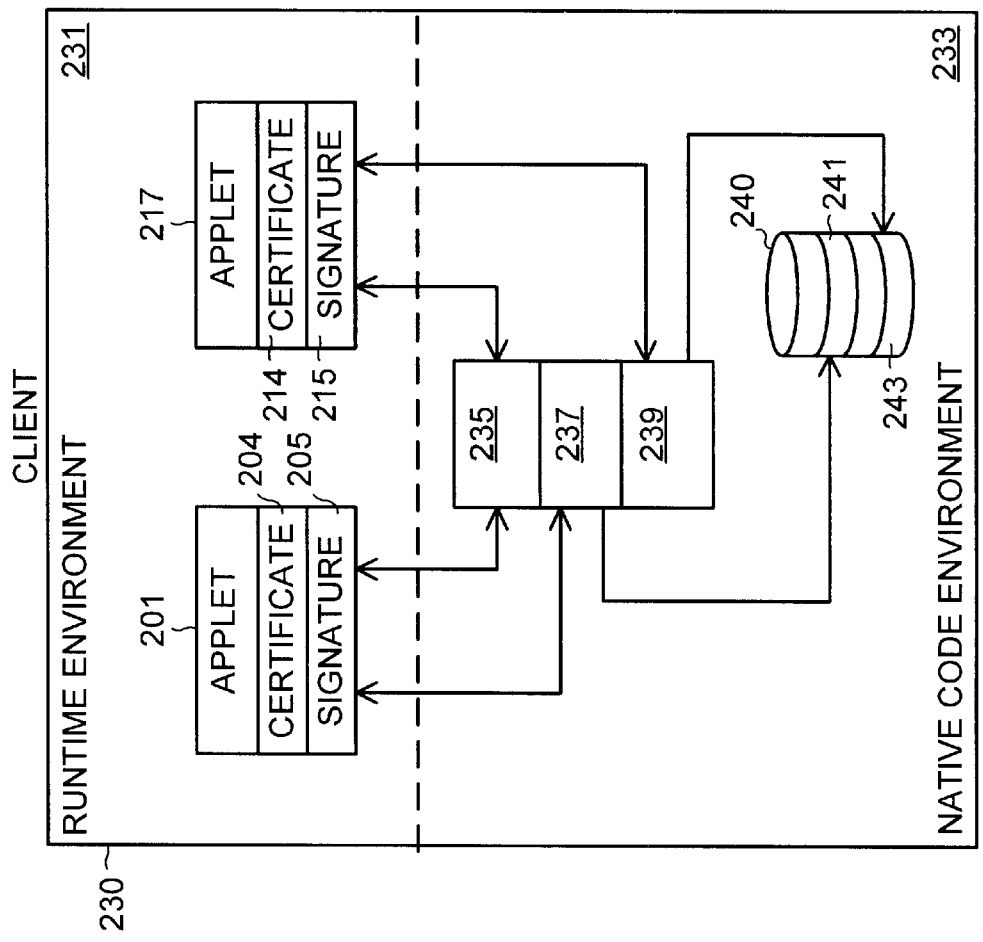

The keying of the individual storage monitor to the applet's certificate means that the same local space cannot be accessed by an applet having a different certificate as illustrated in FIG. 2C. Again the client computer 230 contains two applets downloaded from server computer 220, but unlike the applet 213 in FIG. 2B, downloaded applet 217 has a different certificate 214 than the certificate 204 of the applet 201. Therefore, when the applet 217 needs access to local storage space, the global API 235 assigns a different storage monitor 239 to the applet 217. The storage monitor 239, in turn, allocates a different local space 243 to the applet 217. As explained above in conjunction with the storage monitor 237, the storage monitor 239 provides access and monitoring of the local space 243 to the applet 217.

The system level overview of the operation of an exemplary embodiment of the invention has been described in this section of the detailed description A certificate attached by a principal to an applet is used by an interface process running in the local computer to uniquely identify a portion of persistent local storage to be assigned to the principal, and hence the applet. A digital signature attached to the applet specifies the principal's local storage capabilities which are used by the interface process to determine the amount of storage to assign, and by a storage monitor process to enforce the restrictions defined by the capabilities. While the invention is not limited to any particular configuration, for sake of clarity simple distribution data structures containing digital certificates and digital signatures for two client processes have been described. As will be readily apparent to one skilled in the art, the local storage can be on any persistent storage media, the functions performed by the client can be distributed among many processing modules or consolidated into one, and technologies other than certificates and digital signatures can be used to identity principals and their capabilities.

Methods of an Exemplary Embodiment of the Invention

In the previous section, a system level overview of the operation of an exemplary embodiment of the invention was described. In this section, the particular methods performed by the client of such an exemplary embodiment are described by reference to a series of flowcharts. The methods to be performed by the client constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). The methods are described in terms of an object-oriented programming language, such as C++, but the concepts are readily applicable to other programming paradigms by one skilled in the art. Objects communicate with other objects through messages, and objects exchange input and output with a user through data streams.

Figure 3A:
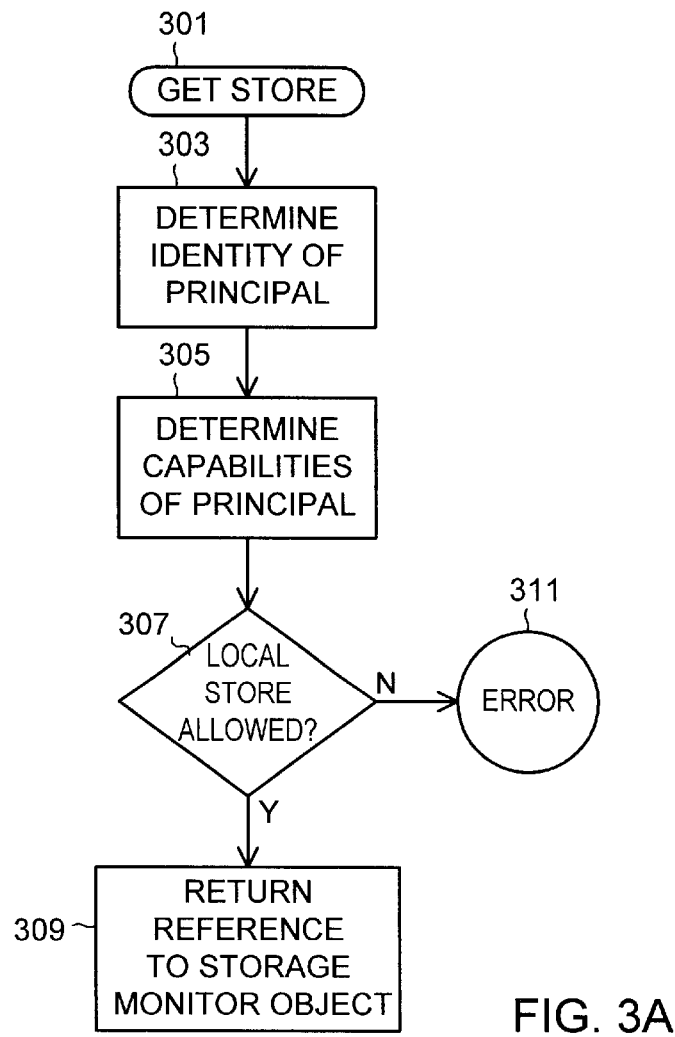

Referring first to FIG. 3A, a flowchart of a method to be performed by a client according to an exemplary embodiment of the invention is shown. This method is inclusive of the steps or acts required to be taken by a global client storage manager object, such as the global storage manager API 235 in FIG. 2A, in assigning a storage monitor, such as the storage monitor 237, to a process executing on behalf of a principal, such as applet 201, on a client computer, such as computer 230. When the process begins executing, its principal is determined by the certificate attached to the process code. Each principal having a process currently executing or waiting to execute is assigned an "identity." The identity associates the principal with its infrastructure components in the client computer, such as the digital signature(s) attached to process(es) executing on behalf of the principal. Identities for all principals which have a process currently executing or waiting to execute are kept on an execution stack in the client. The identity of the principal whose process is currently executing is referred to as the currently active identity on the stack. The identity is assigned and maintained by a system level function in the client computer. In these terms, the process is referred to as executing on behalf of its identity.

As shown in FIG. 3A, a currently executing process, such as applet 201, sends a message requesting local storage, such as local space 241, to a global client storage manager object (step 301). The global storage manager object scans the execution stack for the currently active identity (step 303) The global client storage manager object obtains the digital signature associated with the currently active identity and decodes it as described above to determine the principal's permitted capabilities, such as those shown in data structure 211 in FIG. 2A, and hence for the process currently executing on behalf of the principal (step 305). The global storage manager object then determines whether the principal's capabilities include an amount of permitted local storage (step 307). If so, the process is permitted access to local storage and the global client storage manager object returns to the process a message containing a reference to a storage monitor object, such as storage monitor 237 in FIG. 2A (step 309). If the principal's capabilities do not include local storage, the global client storage manager object signals an error (step 311). The error can be handled by special error handling mechanisms at the system level, within the process itself, or by other processes well-known to one skilled in the art.

Figure 3B:
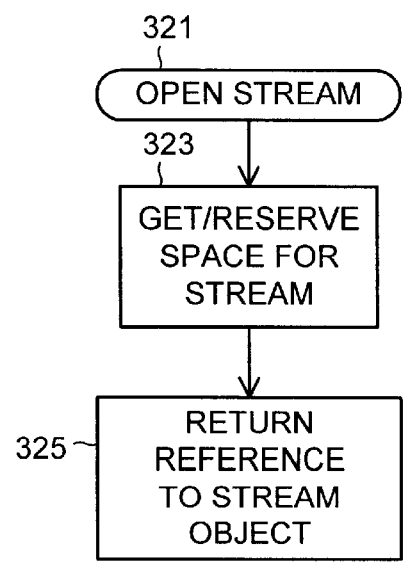

After the process has received the message containing the reference to the global storage monitor object, it sends a message to the global storage monitor object requesting that a named data stream be opened (FIG. 3B, step 321). Data in standard input and output data streams is allocated to a temporary storage sandbox, but a data stream opened through the global storage monitor object is stored in persistent local storage. The global storage monitor object reserves an initial amount of local storage space for a new data stream, or gets local storage space associated with an existing data stream with the same name (step 323). The global storage monitor object returns a reference to a stream object for the assigned local storage space to the calling process (step 325).

Once the data stream is opened, the process can read and write data to the reserved local storage space. The storage monitor object monitors the data written to the local storage space to enforce the limits imposed by the digital signature on the principal of the process. Thus, when the process issues a write command (FIG. 3C, step 331), the storage monitor object checks to see if the reserved space has been exhausted (step 333). If not, the storage monitor object performs the write (step 335), updates the amount of space used by the principal (step 337), and returns control to the process (step 337). On the other hand, if the reserved space limit has been exceeded, the storage monitor object checks to see if the principal's limit as specified in the digital signature has been exceeded (step 341). If the principal has exceeded its limit, the process executing on its behalf cannot store any more data and the storage monitor object so informs the process at step 343. If the principal has not exceeded its limit, the storage monitor object can still deny the process more storage space (step 351) if the digital signature for the currently active identity indicates that the principal is subject to the global limit (step 345), and the global limit has been exceeded (step 349). Otherwise, the storage monitor object allocates more space for the process at step 347 and writes the data into all or part of the newly allocated space.

The particular methods performed by a client of an exemplary embodiment of the invention have been described. The method performed by a global client storage manager object has been shown by reference to a flowchart including all the steps from 301 until 311. The methods performed by a storage monitor object has been shown by reference to flowcharts including all the steps from 321 until 325, and from steps 331 until 351. The steps in all three flowcharts can be performed by a single process or object, or the steps can be assigned to different processes than those described above without departing from the scope of the invention.

Java Implementation

In this section of the detailed description, a particular implementation of the invention is described that is based on the Java language and used in connection with the World Wide Web. One of the most successful applications of distributed processing is the World Wide Web. Over the years the Web has evolved from servers that displayed only static, text-based content to servers with animation, sounds, and interactive content The active content is supported in part by downloading small, executable applications, or applets, from a server to a local, or client, computer. An applet executing on the local computer interacts with user input and can also access data on the server.

Java is an object-oriented language which is frequently used to write applets for the Web, and is understood by those of ordinary skill in the art. Java source code is complied into platform-independent "byte codes" that make up Java classes. The byte codes of a downloaded Java applet are interpreted by a Java runtime environment into machine-specific instructions. The Java runtime environment is hosted by a native process executing in a native code environment, such as shown in FIG. 2A. A common native process which hosts Sava Web applets is an Internet browser such as Microsoft Internet Explorer.

A standard downloaded Java applet only has access to memory associated with the objects created by the applet and to an amount of other temporary storage space necessary to support input and output data streams used by the applet to communicate with the user. All this storage space is transient and thus this "sandboxing" approach provides a level of security against mis-behaving Java applets. Most implementations of the Java language support a native interface (JNI) that enables Java code to interoperate with applications and libraries written in other languages and running in a native code environment as if they were Java objects. The present invention utilizes the JNI to enable a Java applet to interface with native code applications that manage persistent local storage through the digital signature facility described above in conjunction with FIGS. 2A, 2B, and 2C.

Figure 3C:
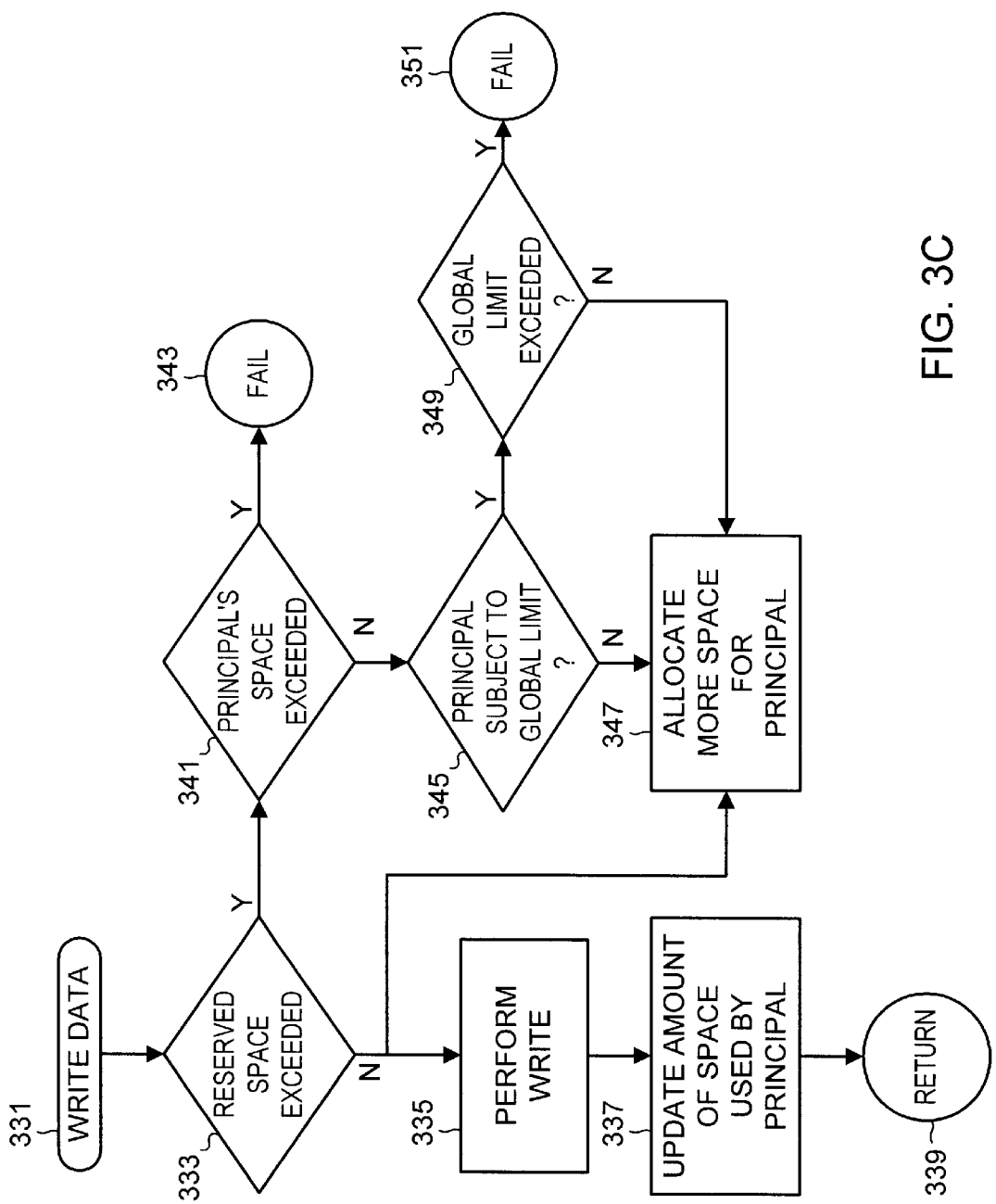

Following is an example of Java code that accesses local storage through non-Java, native code applications using the methods shown in the flowcharts of FIGS. 3A, 3B, and 3C. The method of FIG. 3A is performed by a native client storage manager application or library which is defined as a Java object "ClientStorageManager." The methods of FIGS. 3B and 3C are performed by a native storage monitor application or library which is defined as a Java object "ClientStore." A ClientStore object is created for each principal having a process that executes the exemplary code Comments in the code are denoted by text enclosed in "/* */" pairs and explain the purpose of each line of code.

```
/* Use the ClientStorageManager object to scan the stack
    for the currently active identity and return a ClientStore
    object for that identity */
ClientStore store=ClientStorageManager.getStore( );
/* Use the ClientStore object to open an OutputStream
    object for writing with the given name */
OutputStream out=store.openWritable(Asomename≅);
/* Declare the type of data to be written to the stream as
    bytes */
byte[ ] data;
. . .
/* Write the data to the stream; the amount of data written
    is monitored by the ClientStore
    object from which the OutputStream object was obtained
    */
out.write(data);
. . .
/* Close the stream */
out.close( );
```

Error messages from the ClientStorageManager and the ClientStore objects, known as Java "exceptions," can be handled either at the applet level or at the runtime environment level.

Conclusion

An invention providing unshared local storage space to a process through the use of an identity associated with the process has been described. The invention provides the process with local storage which is secured, limited, and flexible. It is superior to the standard sandboxing approach for supplying temporary storage space to processes in that it provides persistent storage without sacrificing security. Furthermore, unlike push technology, the decision to trust a source can be made prior to the time the application is acquired from the source.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention For example, those of ordinary skill within the art will appreciate that applications written in C++ or similar object-oriented languages can be easily adapted to work with processes coded in accordance with the methods of the invention. Furthermore, those of ordinary skill within the art will appreciate that the data structures attached to the program code can be expanded to include additional limitations on the execution of applications. Additionally, the invention is not limited to applications downloaded from a network but is equally applicable to other applications distributed through other media as will be readily apparent to one skilled in the art.

The terminology used in this application with respect to an application=s access to persistent local storage is meant to include all of these cases. Therefore, it is manifestly intended that this invention be limited only by the following claims and equivalents thereof.

We claim:

1. A computerized method for providing unshared access to local persistent storage space on a local computer to a program executing on the local computer on behalf of a securely certified identity, the method comprising the steps of:
    determining the identity on which behalf the program is executing on the local computer from a secure certificate;
    determining local capabilities requested by the identity for the program from the secure certificate, the local capabilities specifying an amount of local persistent storage space;
    allocating the local persistent storage space on a persistent storage media to the program for unshared access during execution thereof on the local computer as specified by the local capabilities requested by the identity;
    associating the local persistent storage space with the identity; and
    limiting access to the persistent storage by the program to the allocated local persistent storage space.

2. The method of claim 1, further comprising the step of monitoring use of the persistent storage media by the program to enforce the local capabilities requested by the program.

3. The method of claim 1, wherein the program has a digital signature encoded with the local capabilities requested by the process.

4. The method of claim 2, wherein the local capabilities comprise a maximum allowed size of local persistent storage space allocated to the identity, and wherein the step of monitoring the use of the persistent storage media comprises the step of determining if the maximum allowed size for the local persistent storage space for the identity has been exceeded.

5. The method of claim 4, wherein the local capabilities further comprise an applicability of a global limit for local persistent storage space to the identity, and wherein the step of monitoring the use of the persistent storage media further comprises the step of determining if the global limit for local storage space has been exceeded when the maximum allowed size has been exceeded and the global limit is applicable to the identity.

6. The method of claim 1, wherein the program has a certificate uniquely identifying the identity.

7. The method of claim 1, wherein the principal is the provider of a remotely-sourced program executing the process.

8. A computer-readable medium having computer-executable instructions for performing steps that cause a local computer to provide unshared storage space on a persistent storage medium to a process executing on behalf of an identity, the steps comprising:
    determining the identity on which behalf the process is executing;
    obtaining a digital certificate for the process, the digital certificate specifying a request for local capabilities including local storage space on the persistent storage medium for the identity;
    decoding the digital certificate to establish local capabilities requested for the identity;
    allocating the local storage space to the process as specified by the local capability request;
    associating the local storage space with the identity; and
    limiting access to the persistent storage by the program to the allocated local persistent storage space.

9. The computer-readable medium of claim 8, further comprising computer-executable instructions for performing the step of monitoring use of the local storage space by the process to enforce the local capabilities requested by the process.

10. The computer-readable medium of claim 9, wherein the step of monitoring comprises computer-executable instructions for performing the step of determining if a macimum allowed size for local storage space for the identity has been exceeded.

11. The computer-readable medium of claim 10, wherein the step of monitoring further comprises computer-executable instructions for performing the step of determining if a global limit for local storage space has been exceeded when the maximum allowed size has been exceeded and the local capabilities specify that the global limit is applicable.

12. A computer-readable medium having stored thereon a data structure associated with an identity, the data structure comprising:
    a first data field containing data that uniquely identifies the identity;
    a second data field containing data representing local storage capabilities requested for the identity identified by the first data field, the local storage capabilities including a size of a local storage space on a persistent storage medium of the local computer; and
    executable code for executing a process on behalf of the identity identified by the data in the first data field, wherein the process is constrained by the local storage capability request represented by data in the second data field to have unshared access to only local storage space allocated as specified in the request on the persistent storage medium.

13. The computer-readable medium of claim 12, wherein the second data field comprises a third data field containing data representing a maximum size of the local storage space permitted to be allocated to the process executing on behalf of the identity identified by the first data field.

14. The computer-readable medium of claim 13, wherein the second data field further comprises a fourth data field containing data representing an applicability of a global limit on a size of the local storage space if the size of the local storage space exceeds the maximum size represented by data in the first data field.

15. A computerized system comprising:

a server operative for transferring executable code for a process using a communications medium; and a client operative for receiving the process, for determining an identity for the process, and for decoding an infrastructure component identified by the identity to determine a local persistent storage space capability limiting the process to unshared access to an amount of local persistent storage on the client, the client comprising a local persistent storage medium for retaining data used by the process;

the client further operative for assigning local storage space on the persistent storage medium to the process and for monitoring the use of the local persistent storage medium by the process for compliance with the requested capability.

16. A computerized client that manages local space allocated on a local computer to a process, the computerized client comprising:

a persistent storage medium;

a client storage manager module operative for determining an identity and local persistent storage capability for the process when executed on the client, and allocating local space on the persistent storage medium for unshared access by the process as requested for the identity; and a client monitor module operative for monitoring access by the process to the persistent storage medium and limiting access to the persistent storage medium by the process to said unshared access to the allocated local space.

17. The computerized client of claim 16, wherein the client monitor module enforces local capabilities requested by the identity on the use of the allocated local space by the process.

* * * * *

UNITED STATES PATENT AND TRADEMARK OFFICE
CERTIFICATE OF CORRECTION

PATENT NO. : 6,584,495 B1 Page 1 of 1
DATED : June 24, 2003
INVENTOR(S) : Jeffrey A. Bisset, Michael Jerger and Michael Toutonghi It is certified that error appears in the above-identified patent and that said Letters Patent is hereby corrected as shown below:

Column 2,
Line 10, "available," should read -- available. --.
Line 32, "paces" should read -- space --.
Line 57, "scope In" should read -- scope. In --.

Column 5,
Line 27, "memory The" should read -- memory. The --.
Line 43, "data Certificates" should read -- data. Certificates --.
Line 46, "F trustworthy" should read -- trustworthy --.
Line 57, "key if" should read -- key. If --.

Column 7,
Line 55, "description A" should read -- description. A --.

Column 8,
Line 55, "(step 303)" should read -- (step 303). --.

Column 10,
Line 1, "content The" should read -- content. The --.
Line 14, "Sava" should read -- Java --.
Line 41, "code Comments" should read -- code. Comments --.

Column 11,
Line 18, "invention" should read -- invention. --.

Column 12,
Line 46, "macimum" should read -- maximum --.

Signed and Sealed this

Twenty-seventh Day of January, 2004

JON W. DUDAS
*Acting Director of the United States Patent and Trademark Office*